US000001497H

United States Statutory Invention Registration [19]

[11] Reg. Number: H1497

Marshall

[45] Published: Oct. 3, 1995

[54] DUAL-CHANNEL COLLECTION AND USE OF SPEECH CORRECTION SIGNALS

[75] Inventor: Patrick T. Marshall, Beavercreek, Ohio

[73] Assignee: The United States of America as represented by the Secretary of the Air Force, Washington, D.C.

[21] Appl. No.: 86,578

[22] Filed: Jul. 6, 1993

[51] Int. Cl.[6] ..... G01L 5/06

[52] U.S. Cl. ..... 381/43; 381/41; 395/2; 395/2.63

[58] Field of Search ..... 395/2, 2.63, 2.65; 381/41, 42, 43; 250/338.1; 430/944

[56] References Cited

U.S. PATENT DOCUMENTS

| | | | |
|---|---|---|---|
| 3,192,321 | 6/1965 | Nassimbene . | |
| 4,437,002 | 3/1984 | Tanigushi et al. | 250/338.3 |
| 4,757,541 | 7/1988 | Beadles | 381/43 |
| 4,769,845 | 9/1988 | Nakamura | 381/43 |
| 4,961,177 | 10/1990 | Uehara | 367/197 |
| 5,153,560 | 10/1992 | Ichikawa | 340/522 |

OTHER PUBLICATIONS

Integrated Modelling of Thermal and Visual Image Generation Oh et al. IEEE 4–8 Jun. 1989 pp. 356–362.

Neural net Lip reading system for improved speech Recognition Stork et al. IEEE 7–11 Jun. 1992 pp. 285–295.

Peripheral Vision Lip reading Aid Ebrahimi et al IEEE Oct. 1991 pp. 944–952.

Integrated Analysis of Thermal and Visual Images for Scene interpretation. Nandhakumar, IEEE Jul. 4, 1988.

Proceedings of Speech '85, Automatic Lipreading to Enhance Speech Recognition Eric D. Petajan, AT&T Bell Laboratories., Jun. 19–23, 1985, San Francisco Calif. IEEE Computer Society Conference on Computer Vision & Pattern Recognition.

Proceedings of Speech '88, A Multi–Channel Physiological Data Acquisition System Based on an IBM PC, and Its Application to Speech Therapy, 7th Fase Symposium, Edinburgh, IBM UK Scientific Centre and Department of Linquistic Science.

*Primary Examiner*—Bernarr E. Gregory

*Attorney, Agent, or Firm*—Gerald B. Hollins; Thomas L. Kundert

[57] ABSTRACT

A multiple channelled speech data collection and image presentation system is disclosed; in this system audio inputs originating with a user actuated microphone and the photo signals originating with an integrated detector such as a photo diode or infrared sensor are represented in user comprehendable graphic form in order that the user can be appraised of speech deficiencies and recognize accomplished improvements. The invention is also useful for speech professionals such as pathologists, therapists and teachers in order to enhance the instructions they provide to the patient or student. A matching template arrangement for instructing the patient or student is also disclosed.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DUAL-CHANNEL COLLECTION AND USE OF SPEECH CORRECTION SIGNALS

RIGHTS OF THE GOVERNMENT

The invention described herein may be manufactured and used by or for the Government of the United States for all governmental purposes without the payment of any royalty.

BACKGROUND OF THE INVENTION

This invention relates to the field of speech pathology and speech therapy, language learning, and other speech assistance activities.

Speech pathology and speech therapy and language learning are often conducted by converting acoustic sound waves generated by human organs into the digitized equivalent of a type script file. This data is then further reduced and processed to obtain certain acoustical speech information (such as frequency spectrum, energy distribution, and so on) about the subject. The results are then used to determine problem areas and to prescribe solutions for speech pronunciation problems.

Most of the speech teacher's or pathologist's or therapist's effort toward advancement of the speech art has recently been concentrated on implementing special algorithms that process audio information only. However, there is additional information other than an audio signal which can be used in this area of the speech field. Deaf people, who are trained lip readers, use this information by observing certain visual cues produced by the mouth and surrounding areas of a speaker's face. This same type of information is available through the present invention to speech therapists and teachers, and is capable of increasing their ability to analyze speech and assist their patients and students.

The patent art includes a number of examples of combined photo and audio speech recognition systems. Included in this art is the U.S. Pat. No. 3,192,321 of E. G. Nassimbene, which is concerned with a headset having both microphone and photo pick-ups. Since the Nassimbene apparatus contemplates only a DC coupled photo signal and is not concerned with the medical or teaching aspects of the disclosed apparatus, a ready distinction from the present invention is discernible.

The patent art of interest also includes U.S. Patent No. 4,769,845 issued to H. Nakamura, and concerned with a lip image speech recognition apparatus which employs a camera device in order to achieve data input. The non-camera or integrated signal pick-up arrangement of the present invention is distinguished over this camera input characteristic of the Nakamura patent.

Also included in this patent art is U.S. Pat. No. 4,757,541 issued to R. L. Beadles, and concerned with an audiovisual speech recognition system in which an optical scanning or a non integrated video signal is employed.

Another patent of interest includes U.S. Pat. No. 5,010,495 issued to J. A. Willetts, and concerned with an interactive computer assisted language learning system which allows a student to select a model phrase, record his own pronunciation of that phrase, and instantly listen to the digitized vocal version of the selected phrase. The use of a microphone-only arrangement is distinguished from the present invention.

The patent art of interest also includes U.S. Pat. No. 4,769,846 issued to W. F. Simmons, and concerned with a speech therapy translator which converts minimal manipulation to aural conversation using basic words and statements necessary for rehabilitating patients who are speech handicapped. Again, the use of a micro- phone-only arrangement is distinguished from the present invention.

Of additional interest with respect to prior patents is U.S. Pat. No. 4,961,177, which discloses method and apparatus for inputting a voice through a microphone in which a camera system is used to keep a microphone located in an appropriate position with respect to a human speaker.

SUMMARY OF THE INVENTION

In this invention, a photodetector and a microphone are combined for the purpose of conducting speech pronunciation measurements and display. The resulting data is employed to detect problems and help identify solutions relating to speech production for verbally challenged individuals in either the speech therapy, speech pathology, language learning, or basic education fields, for example. A plurality of photodetector arrangements are employed, with each accomplishing integrated waveform sensing from the lip and mouth regions of a patient or student during speech production. According to the invention, information obtained from the microphone is used primarily to display "acoustical " data (e.g., formants, pitch, etc.) about the subject. The photo and infrared information is used to display "mouth/lips/tongue/motor " information about the subject.

It is therefore an object of the present invention to provide a lip, tongue and mouth movement assisted arrangement for speech learning and speech therapy.

It is another object of the invention to provide a tongue, lip and mouth movement speech information signal that is based on information collected with an integrated motion responsive signal from a photodiode or thermal sensor transducer device.

It is another object of the invention to provide dual channel speech assistance information in which one channel is based on audio sounds and the other channel is based on tongue, lip and mouth movement information obtained from the student or patient.

It is another object of the invention to provide amplitude time, and frequency acoustical information (such as formants and pitch) obtained from a microphone.

It is another object of the invention to provide an alternate lip and mouth movement sensing arrangement in which information may be obtained from reflected visual spectrum optical energy as well as from infrared energy emitted by the body temperature of the student or patient information contrasted by surrounding "cooler " areas of the face.

Additional objects and features of the invention will be understood from the following description and claims and the accompanying drawings.

These and other objects of the invention are achieved by the speech learning and therapy method comprising the steps of:

generating an analog microphone electrical signal representation of predetermined word-phrase utterance vocal sounds by a speech student therapy patient;

forming an integrated image two-terminal photosensor analog photo electrical signal representation of said student/patient lip, tongue and mouth movements during said predetermined word-phrase utterance;

digitizing each of said microphone and photoelectrical signals;

storing a time sequence of said digitized microphone and digitizing photo electrical signals in an electronic digital memory;

presenting an amplitude vs. time representation of said digitized microphone and digitized photo word-phrase electrical signals on a visual display;

forming an amplitude vs. time representation image of a digitized template ideal utterance of said word-phrase on said visual display, said ideal utterance image being of said same word-phrase and selectably including both microphone and photo electrical signals therein;

encouraging said student/patient to match his or her utterance digitized microphone and digitized photo electrical signals with said template ideal utterance representation images in a repeating utterance sequence.

DETAILED DESCRIPTION

Figure 1:
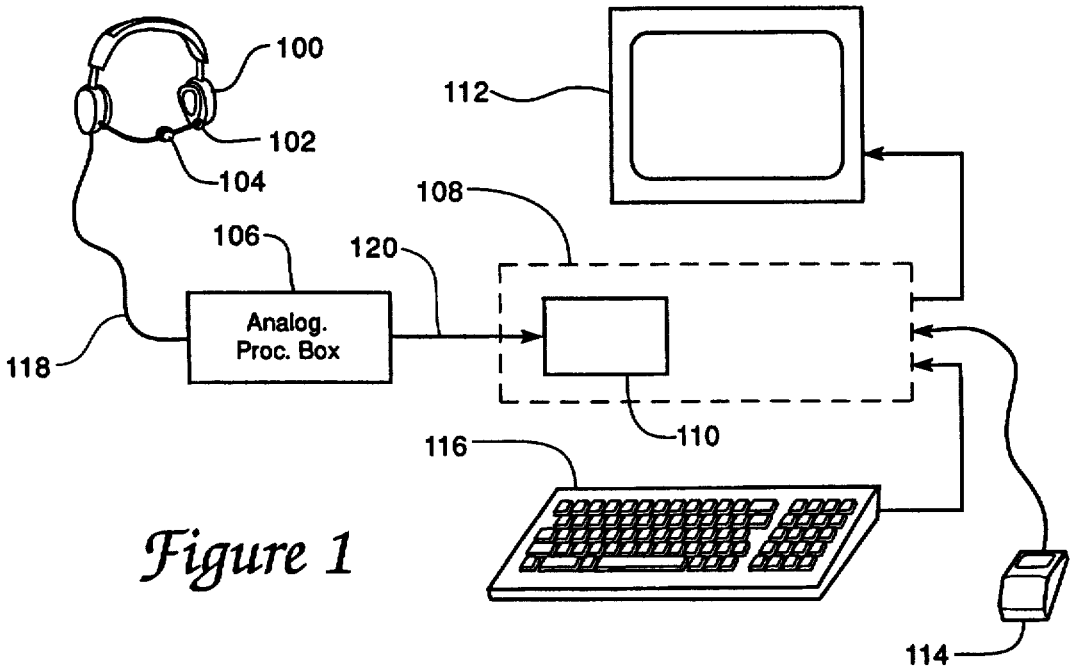
FIG. 1 shows a system for using signals collected in accordance with the present invention.

FIG. 1 (or FIG. 1) in the drawings (these nomenclatures are used interchangeably) shows a computer-based electronic system for dual-channel collection and use of speech correction signals in accordance with the invention. In this FIG. 1 embodiment of the invention, a user headset 100 is shown to be provided with a combination of photodetectors and/or thermal detectors 102 with the former of these being also provided with a light emitting diode source of optical illumination energy. Also mounted on the headset 100 is a microphone 104. All of these energy transducers provide electrical signals to an analog signal processing apparatus 106 by way of the multiple channeled flexible tether cord 118.

The circuitry of the analog signal processing apparatus 106 prepares the photo, infrared, and audio signals to be digitized by the analog-to-digital converter board 110. Specifically, the circuitry of box 106 includes transimpedance and gain generating amplifiers, low-pass and high-pass filters, and envelope detectors.

Processed analog signals from the apparatus 106 are communicated along the path 120 to the digital computer 108 which includes the analog-to-digital converter circuit board 110. The sampling frequency of this board 110 should be at least twice the low-pass filter cutoff frequency to avoid aliasing.

Additional inputs to the computer 108 are provided by the keyboard 116 and the manually-operated control or mouse 114. Displaying of the computer input and output data and other information is accomplished by the user viewable display 112.

Although the function of the elements shown in FIG. 1 will be described in greater detail below, the display 112 is used principally to present the patient and teacher/therapist with menus and to display digitized patient signals. The keyboard 116 and mouse 114 are used to set up the learning sessions and answer questions programmed into the learning material. In addition, the keyboard 116, the up/down, left/right arrow keys and mouse 114 are used to graphically manipulate the audio, infrared and photo signals to obtain, if necessary, an "ideal " template for the subject to match his or her utterances to. The microphone and photo sensors at 104 and 102 may be powered from the computer 108 or be of the self- powered nature in the instance of an infrared sensor and certain types of microphones.

Figure 2:
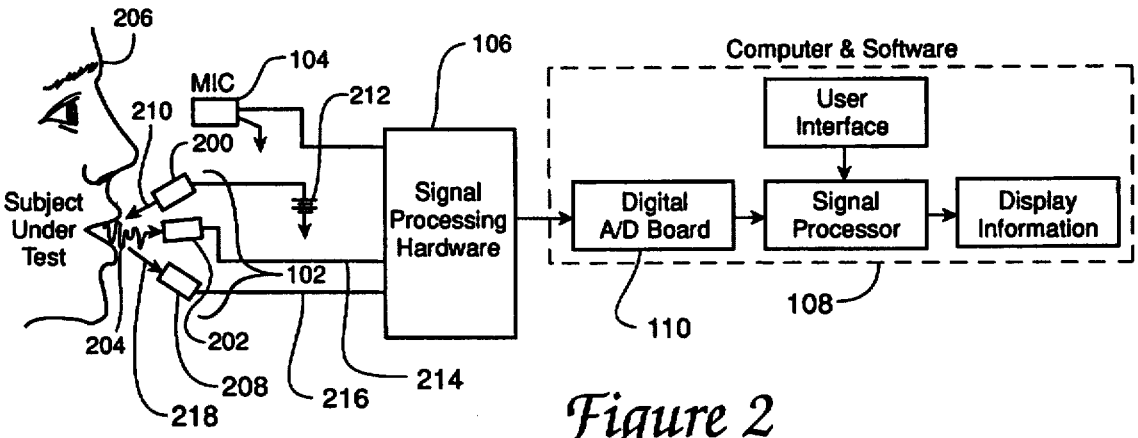
FIG. 2 shows additional details of the FIG. 1 system.
Figure 3:
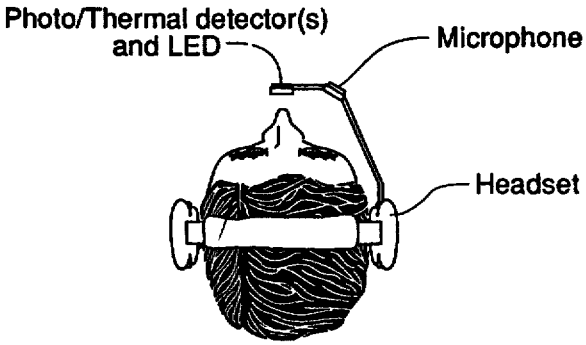
FIG. 3 shows the relationship between a data collection apparatus according to the invention and a user patient.

FIG. 2 in the drawings shows additional details of the FIG. 1 system. Certain portions of the FIG. 2 illustrated system use the same identification numbers as employed in FIG. 1. These repeated elements in the FIG. 2 drawing include the signal processing apparatus 106, the computer 108 and the analog-to-digital converter board 110.

Additionally shown in the FIG. 2 arrangement of the invention are the photodetector 208 and its accompanying light source 200, this light source is preferably in the form of a light emitting diode of spectral compatibility with the photodiode photodetecor 208. Also shown in FIG. 2 is a far-infrared spectral region infrared detector or thermal sensor 202, by which heat energy originating in the patient or subject under test 206 is converted into an electrical signal communicated along the path 214. Electrical signals from the photodiode photodetector 208 are similarly communicated along the path 216 to the signal processing hardware 106. In combination, the two detectors 202 and 208, and the light emitting diode or illumination source 200 comprise a detector assembly as was described at 102 in FIG. 1 of the drawings.

Additional details relating to the present invention are to be found in my copending patent applications filed of even date herewith, identified as Ser. Nos. 08/086,577 and 08/086,576, which are respectively titled Audio and Amplitude Modulated Photo Date Collection for Speech Recognition and with Audio and Infrared Collection of Speech Recognition Data. These patent documents are hereby incorporated by reference herein.

Light from the light emitting diode 200 is directed along the path 210 to the lip and mouth area of the patient or user subject under test 206. Light reflected from this area is received along the path 218 at the photodiode photodetector 208. Thermal energy originating in the normal 98.6° F. body temperature of the patient or user subject 206 is shown to travel along the path 204 to the thermal detector 202. The battery 212 in FIG. 2 is used where the signals along the path 216 are intended to be of a direct current or modulated direct current type. However, when the pulse modulated light emitting diode of the above incorporated-by-reference and copending patent application is employed, the battery 212 is replaced with an oscillator provided pulsating source of electrical energy. Either the battery operated light emitting diode arrangement or the pulsating energy source energized light emitting diode may be used in the FIG. 1 and FIG. 2 embodiments of the present invention.

In addition to the two above incorporated-by-reference copending patent applications, additional information concerning the present invention is to be found in my technical academic thesis titled "Speech Recognition Using Visible and Infrared Detectors " which was presented to the faculty of the School of Engineering of the Air Force Institute of Technology, of U.S. Air University, in partial fulfillment of the requirement for the degree of Master of Science in Electrical Engineering and dated September 1992. Copies of this thesis may be obtained from the Air Force Institute of Technology at Wright-Patterson Air Force Base, Ohio 45433, and may also be obtained from the Defense Technical Information Center (DTIC) located at Cameron Station, Alexandria, Va. 22304-6145 using the DTIC identification number AD-A262490. The DTIC copies of my thesis carry a "selection date " of 5 Apr. 1993 and the thesis is approved for public release with unlimited distribution. The contents of this academic thesis are also hereby incorporated by reference herein. One copy of this academic thesis in printed media format is supplied along with the present application papers to the U.S. Patent and Trademark Office for use with any one of the three of my simultaneously filed patent applications. In addition, microfiche copies of this thesis are being sought for supplying to the U.S. Patent and Trademark Office during prosecution of the three patent applications.

During operation of the FIG. 1 and FIG. 2 apparatus, a light emitting diode photosignal is amplitude modulated by the user's mouth and lip region, and this signal is detected by the photodetector whose output is subsequently filtered in the signal processing hardware 106. For the infrared and photo signals an upper cutoff frequency for filtering purposes is located at a frequency of about 25 Hertz, since a 25 Hertz signal is found to be the upper limit of lip movement capability in humans. For special situations an ability to alter this 25 Hertz upper frequency may be provided for the speech therapist by way of a command entered into the computer 108 by way of the keyboard 116 or the mouse 114.

Preferably, the detectors 202 and 208 are provided with a large active detection area in order to increase the signal-to-noise ratio of the system. In a similar manner, a bright light emitting diode is preferred so long as such a diode, operating at the desired one-half inch separation from the user's mouth and lip area, does not cause discomfort or harm to the user/patient. Preferably, the wavelength of the peak response of both the photodetector and the thermal detector and the signal processing circuitry 106 is arranged to be outside of both the fluorescent light spectral range and the sun's spectral band, however, optical filters may be used to compensate the absence of this preferred arrangement.

Standard speech processing algorithms as are known in the electronic and speech recognition art may be employed in the computer 108 to process both the photo and audio signals for the purpose of displaying certain analytical and grahpical information to both speech therapist and his or her patient. An example of a processing template used for this purpose is provided in the drawings of FIGS. 4 and 5 herein.

An especially desirable use of the present invention apparatus is the presentation of both lip movement and audio sourced information to the user/patient and to the teacher/speech therapist in order to provide incentives and rewards for attending the accomplishment of continued exercises and therapy. When used as a learning tool for verbally challenged individuals (with or without guidance from a speech therapist, teacher or phometician), the present invention apparatus is intended to assist communicative and language functions of these individuals and is of assistance in overcoming developmental disabilities.

Figure 4A:
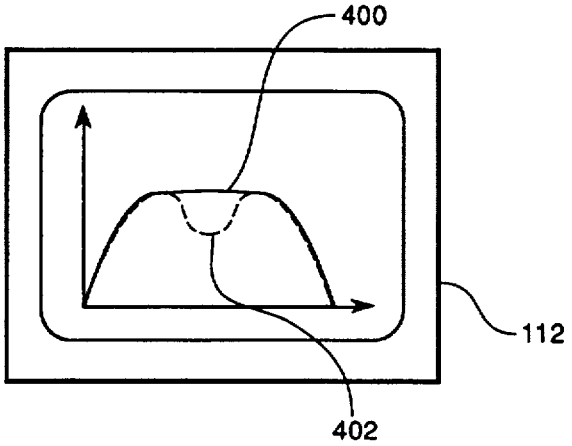
FIG. 4A shows a waveform in accordance with the invention.
Figure 4B:
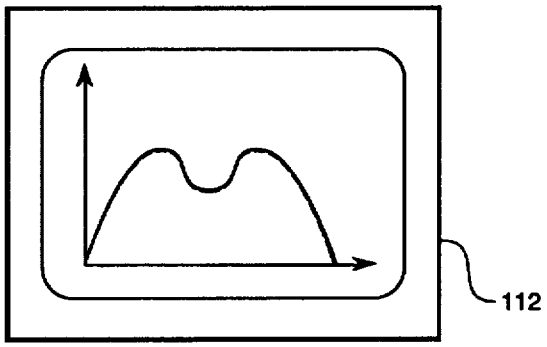
FIG. 4B shows a second waveform in accordance with the invention.

The display 112 in FIG. 1 and FIG. 2 is preferably arranged, upon command from the keyboard 116 or the mouse 114, to present an amplitude vs. time digitized photo word-phrase electrical signal. For example, pitch, voiced/unvoiced regions, etc. are to be displayed at 112. Such information is primarily used by the pathologist or therapist to diagnose "acoustical" problems the patient may have. These representations are based on the sound utterances and lip movements of the user/patient 206. An example of such a lip or mouth movement photo presentation for the display 112 is shown in FIG. 4 of the drawings, where the lip movement waveforms for an impaired and an ideal utterance of the word "zero " is shown. These impaired and ideal movements are depicted in FIG. 4A by the waveforms 400 and 402, respectively. The waveforms of FIG. 4A are representative of a first utterance or initial attempt by a patient or even utterances by some normal speaking persons. After practice and instruction an utterance pattern as shown in FIG. 4B, with a close degree of matching between the actually spoken and the ideal waveforms of the word "zero", is hopefully attained. Analytical information such as correlation coefficients are also displayed on the FIG. 4 screen. These coefficients are used to numerically determine how close the patient is to an ideal waveform match.

The FIG. 4A and 4B drawings are concerned only with lip movement waveform patterns, however, an amplitude vs. time display of digitized audio or vocal signal from the microphone 104 is preferably also made available to the user/patient and teacher/therapist (enabled by way of keyboard commands or mouse-entered commands to the computer 108) in combination with the waveforms of 4B. Examples of these waveforms appear in my above incorporated-by-reference thesis document with a time domain plot of the audio waveform for the word "one " appearing in thesis FIG. 24, along with a frequency domain plot for this same word. FIG. 23 of this incorporated-by- reference thesis document shows a photo time domain plot of lip movement for the word "one", that is, a diagram of the type shown in FIGS. 4A and 4B of the present patent document, while the second or lower part of this thesis FIG. 23 shows a photodetector frequency domain plot for the word "one".

Preferably the computer 108 of the present invention is also provided with Fourier transformation capability in order that the frequency domain information regarding the lower parts of these thesis FIGS. 23 and 24 waveforms also be available to the user and/or therapist/teacher with the present invention. Waveforms of these types for other spoken words by the user/patient are also shown in the thesis document.

Idealized waveforms of the type shown in FIGS. 4A and 4B may of course be obtained from human users pronouncing the word sounds of interest. Alternately, after some experience with the appearance presented by the idealized pronunciations of specific word sounds, a waveform representing such idealized pronunciation may be artificially created using the computer-aided drafting software which is now readily available in the marketplace. A sequence for this computer-aided fabrication of a known idealized waveform is shown in FIG. 5 of the drawings, including the views FIG. 5A, FIG. 5B and FIG. 5C.

Figure 5A:
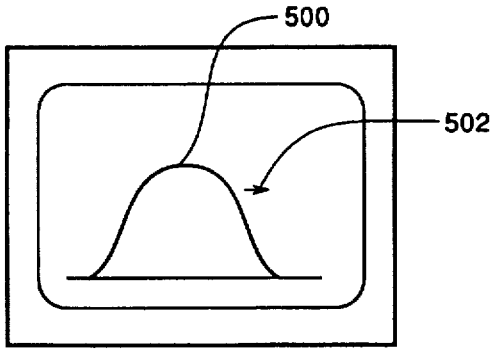
FIG. 5A shows an initial waveform in accordance with the invention.
Figure 5B:
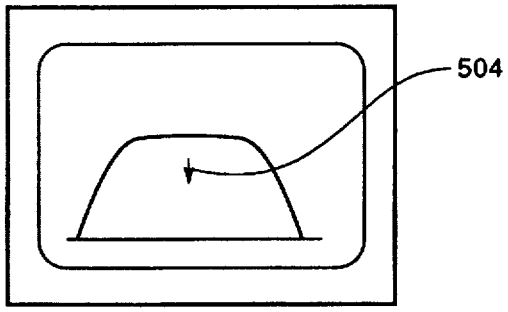
FIG. 5B shows a first modification of the FIG. 5A waveform.
Figure 5C:
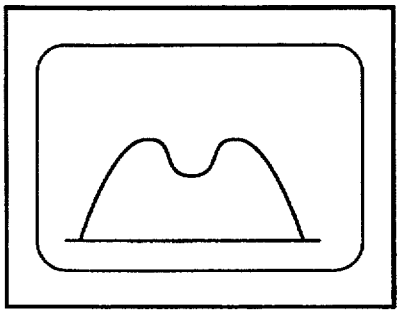
FIG. 5C shows a second modificatioin of the FIG. 5B waveform.

In the FIG. 5A drawing a rudimentary bell-shaped curve 500 is being stretched horizontally as indicated at 502, using the mouse 114 or keyboard 116 input to the computer 108. In the FIG. 5B drawing, a vertical compressing of this bell-shaped waveform is accomplished as is indicated at 504, with the finally adjusted horizontal and vertical shapes being shown in FIG. 5C. This waveform is recognizable as that of the word "zero", as was represented in FIG. 4 of the drawings.

A teaching session for a patient or student employing the present invention may use a format of the following type. In the first step of this session, the subject speaks a particular word or word sound which is processed in the FIG. 1 and FIG. 2 apparatus and digitized with respect to both its photo and audio waveforms and stored on disk or in RAM storage. An observation of this spoken data is then analyzed by the speech pathologist/therapist/teacher to observe defects or deficiencies.

The therapist or teacher may then correct the spoken sound waveform using the computer mouse and/or keyboard entries and store this "ideal " template to disk; alternately the or the therapist may wish to recall a previously stored ideal pronunciation template from disk or RAM storage for comparison. The subject would then utter the same word again, which is then displayed in the manner of waveform 400 in FIG. 4A along with the "ideal" template 402 shown in FIG. 4A. With this display the therapist or teacher may then direct the subject to reiterate the word or phrase while offering suggestions for trying to improve upon the degree of match between his or her waveform and the idealized waveform as shown in FIG. 4B. Analytical and statistical data such as, for example, correlation coefficients, are also displayed to help determine numerically the "degree " of match. These steps may be accomplished for either the photo/lip movement-related waveforms or the audio-related waveforms or for combinations of the photo and audio waveforms presented on the display 112.

It should be noted, of course, that a high degree of match between a user patient uttered sound and an idealized waveform is in essence a speech recognition related event and that persons skilled in the electronic art can easily mechanize such a recognition from the idealized waveform matching event.

The present invention is therefore useful in the correction of a number of speech difficulties, ranging from the learning of a new language to the variety of speech impairments that have been identified in the medical and therapeutic arts. The present invention apparatus is useful, for example, in assisting individuals having developmental disabilities and in the early detection of learning disabilities, as well as in the continuous performance measurement and remediation of such learning disabilities. The invention is also useful in evaluation and therapy prescription activities related to speech, voice, and language disorders, and also in the prescription of procedures and methods for assisting severely aphastic adults with their communication.

The system is also useful in the early stage identification of speech and/or language impairment in children. In the area of behavior, pain, oral motor and sensory function, and epidemiological studies, the invention may be used as a tool to improve the prevention, diagnosis, and treatment of conditions associated with pain in the teeth, jaws and other facial areas. The invention is also useful in the learning of foreign languages. For example, the French language is intense with respect to facial motor responses—responses which can be learned through use of the present invention. The present invention is also useful either with or without the microphone input as an aid to recognizing unintelligible speech originating with handicapped individuals. Speech sounds such as grunts, shouts, howls and the like, may be identified with the present invention apparatus. The invention is also useful in locating word boundaries.

A significant aspect of the present invention is therefore the collection of multiple channels of information regarding speech sounds originating in the patient therapy and student environments and the presentation of visible evidence which defines and identifies these speech sounds with greater precision than has been heretofore available.

While the apparatus and method herein described constitute a preferred embodiment of the invention, it is to be understood that the invention is not limited to this precise form of apparatus or method and that changes may be made therein without departing from the scope of the invention which is defined in the appended claims.

I claim:

1. Bichannel speech learning and therapy apparatus for presenting lip movement and spoken sound indicia in selective coordinated visible form comprising a combination of:

microphone transducer means located near lip and mouth cavity facial regions of a human user for generating a spoken sound electrical signal responsive to speech sounds generated by said user subject;

optical energy to electrical signal detector means located near said microphone transducer member in view of said user lip and mouth cavity facial regions for generating from optical energy signals received from said human user's lip and mouth cavity facial regions, a lip movement responsive electrical signal of correlated relationship with said spoken sound electrical signal;

audio frequency amplifier circuit means connected with said microphone transducer means for amplifying said microphone electric signal into an output signal;

bandpass amplifier circuit means connected with said optical energy to electrical signal transducer means for amplifying selected frequency spectrum portions of said lip movement responsive electrical signal into an output signal; and signal amplitude vs. time electrical signal displaying means for generating a visual pattern representation of said audio frequency amplifier and said bandpass amplifier output electrical signals in representation of said user's generated speech sounds and said user's lip movements, respectively; and template waveform generating means for generating on said electrical signal displaying means a visual pattern representing idealized utterance spoken sound and lip movement responsive electrical signals for predetermined of said user's speech sounds for comparison with said user's generated visual pattern representation.

2. The apparatus of claim 1 wherein said microphone transducer means and said optical energy to electrical signal detector means are located at a distal end of a user supported microphone boom member.

3. The apparatus of claim 1 wherein said optical energy to electrical signal detector means comprises a detector taken from the group consisting of a light emitting diode energized photodiode and a human body heat energized infrared energy responsive detector.

4. The apparatus of claim 3 wherein said detector means further includes a pulsating electrical energy source connected with said light emitting diode.

5. The apparatus of claim 1 wherein said optical energy to electrical signal detector means comprises both a light emitting diode energized photodiode and a human body heat responsive infrared energy detector.

6. The apparatus of claim 5 wherein said infrared energy detector is a pyroelectric crystal polarization detector element.

7. The apparatus of claim 1 wherein said electrical signal displaying means includes digital memory means for updating and refreshing an electronic display portion thereof.

8. The apparatus of claim 1 wherein said electrical signal displaying means comprises a digital computer and associated display screen.

9. The apparatus of claim 1 wherein said electrical signal displaying means includes analog electrical signal to digital electrical signal converter means.

* * * * *